Patented June 15, 1943

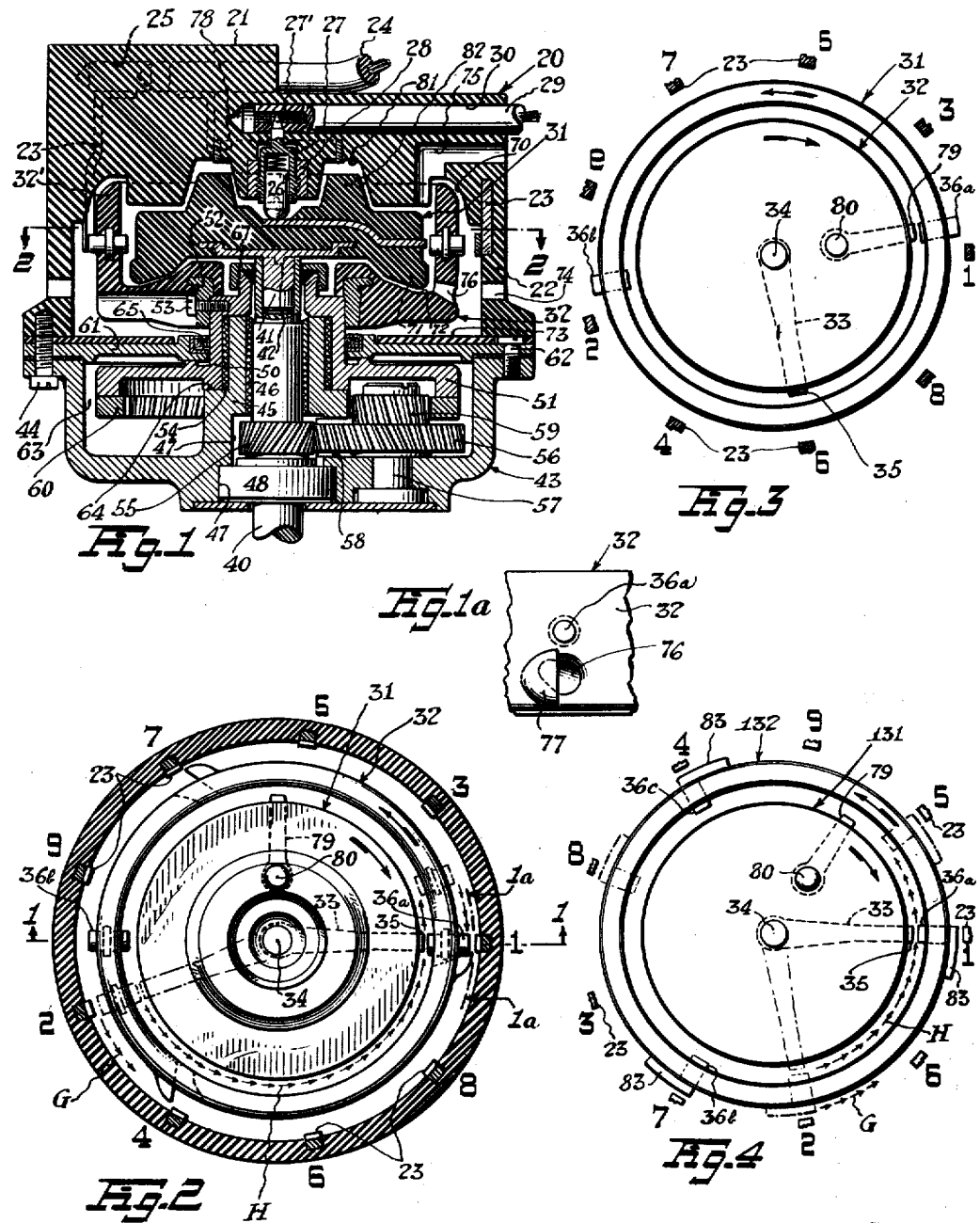

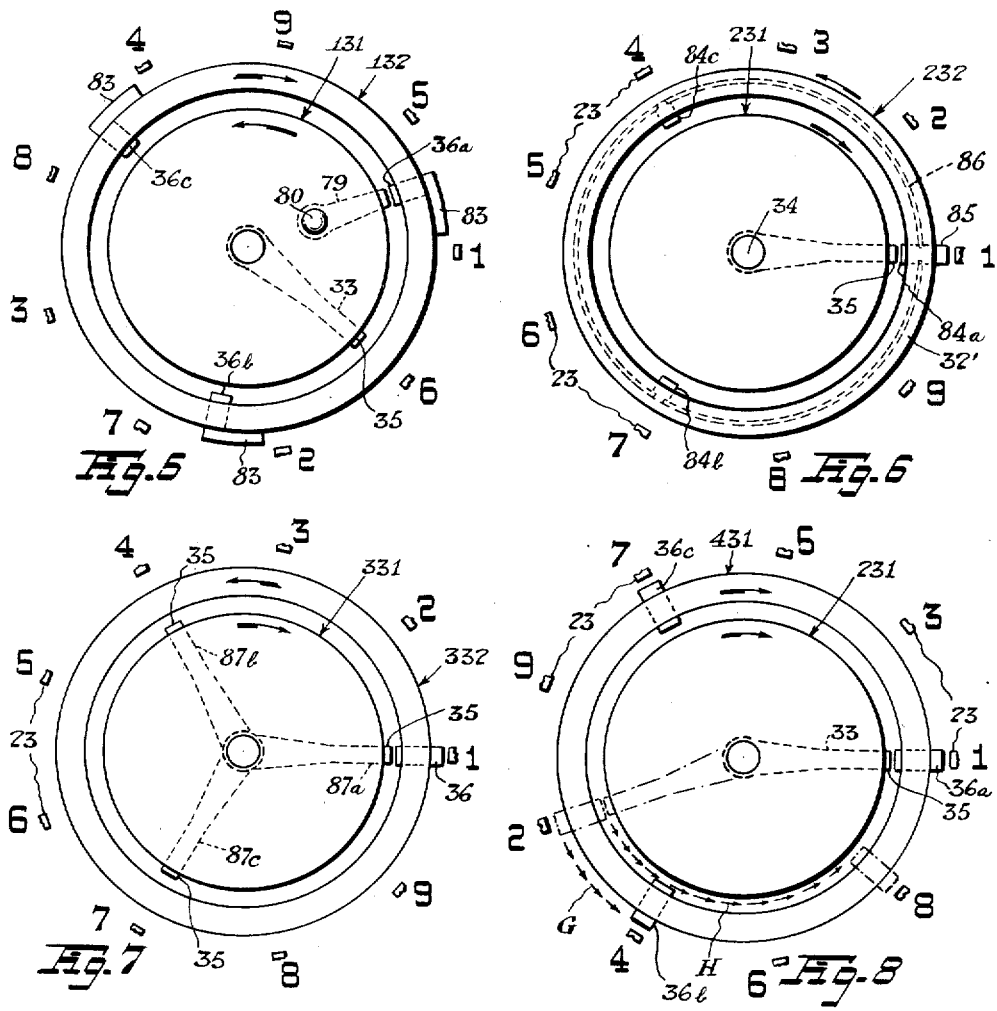
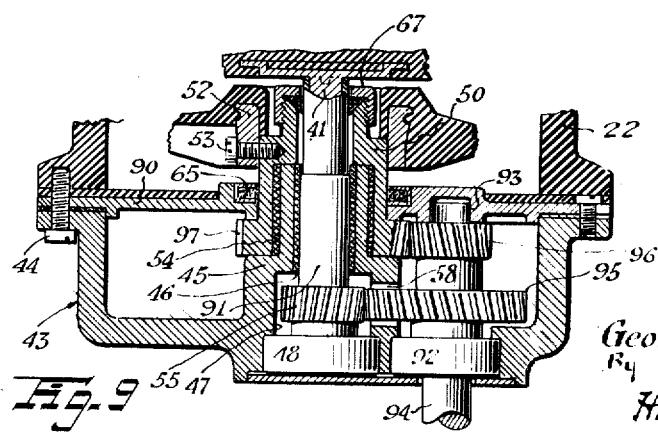

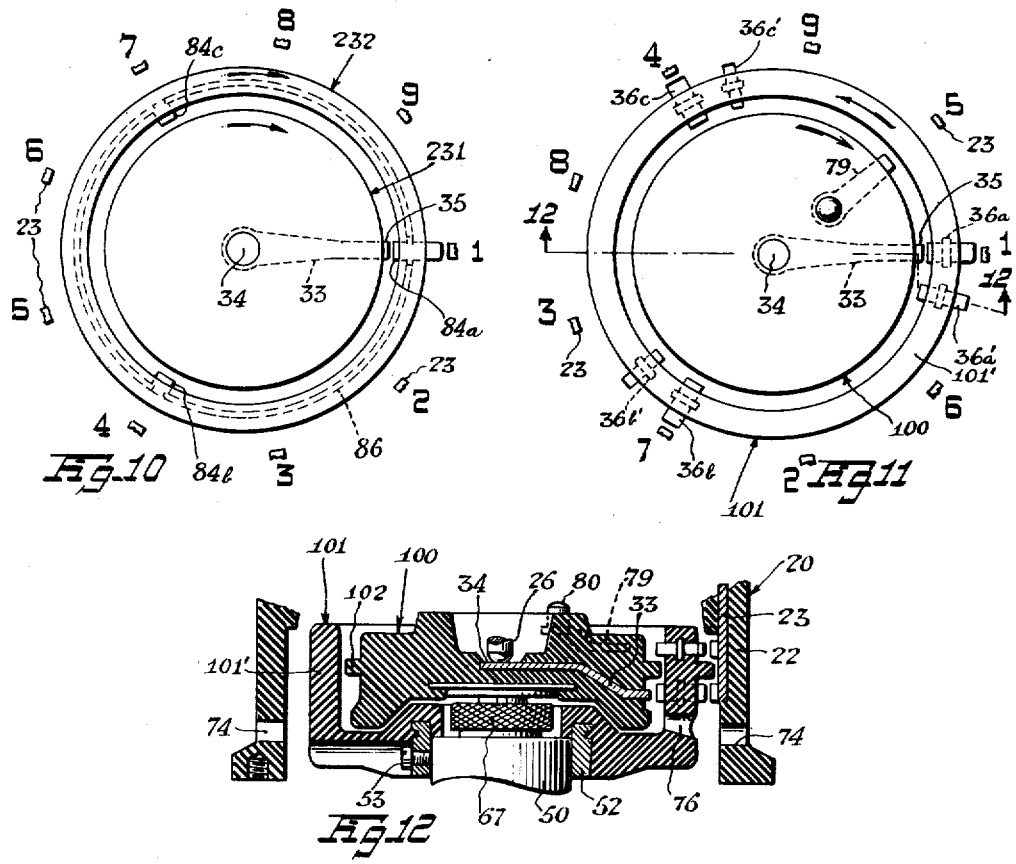

2,321,805

UNITED STATES PATENT OFFICE 2,321,805

ELECTRIC CURRENT DISTRIBUTOR

George H. Fritzinger, Bloomfield, N. J., assignor to Thomas A. Edison, Incorporated, West Orange, N. J., a corporation of New Jersey Application February 11, 1942, Serial No. 430,396

21 Claims. (Cl. 200—24)

This invention has particular relation to ignition current distributors for internal combustion engines, and is especially designed to fulfill the need for a small distributor that will serve engines having large numbers of cylinders and yet provide a large effective insulation between successive distributing positions. The invention has particular utility with aircraft engines, and especially with aircraft which are to fly at high altitudes where there is need for compensating for the reduced dielectric strength of the atmosphere.

The present invention distinguishes fundamentally from conventional distributors by the provision of a novel selector device between the distributing member and the set of leading-out electrodes. This selector device is driven in predetermined relation to the distributing member—as in respect of relative speed and direction—and is subject to various forms. Each form is however arranged so that the distributing member is coupled intermittently to successive ones of the leading-out electrodes selected according to a prescribed plan, and is effectively shielded or isolated from the leading-out electrodes between distributing positions. By the choice of the physical form of the distributing member and selector device and their relative speeds and directions of movement, many different embodiments of the invention are arrived at of which several illustrative embodiments are herein disclosed.

It will be seen that my invention may be practically embodied in a small compact form by providing the selector device in annular form between the usual rotating distributing member and the circularly arranged set of leading-out electrodes and journalling it concentrically with the distributing member. This selector device is driven in relation to the distributing member, but the distributing member is preferably moved at a faster rate through a distance between successive distributing or firing positions which is greater than the spacing of consecutive leading-out electrodes. In so moving the distributing and selector members, and then arranging the selector member to provide a dielectric barrier between the distributing member and the leading-out electrodes as the distributing member moves from one distributing position to the next, there is realized a distributor arrangement having a much greater effective dielectric insulation, as of resistance against arcing between successive distributing or firing positions, than is attained in conventional distributors of like over-all size. This enlarged dielectric insulation is evermore increased when the selector device is driven in a direction opposite to that of the distributing member, for then the leading-out electrodes are fed a succession of current impulses progressing along the series of electrodes in a direction opposite to that of the movement of the selector device, with the result that the arcs trailing the electrodes do not intervene successive distributing positions and thus do not tend to break down the dielectric between the electrodes successively fired. Accordingly, by my invention I may for a given over-all size and for a given number of cylinders to be fired provide a distributor having a greatly increased effective dielectric insulation, or for a given effective dielectric insulation provide a distributor which is either reduced in size or capable of serving greater numbers of cylinders.

My invention has thus for its objects to provide improvements in an electric current distributor whereby the effective dielectric insulation of the distributor may be increased, the over-all size of the distributor may be reduced, and the number of cylinders which the distributor is capable of serving may be enlarged.

It is another object to provide a small compact distributor capable of reliably serving engines having large numbers of cylinders.

Another object is to provide a distributor adapted to aircraft requirements, and particularly one adapted for efficient reliable service with aircraft which are designed to fly at high altitudes in the rarified atmosphere.

Another object is to provide an improved distributor wherein the distributing member is effectively shielded from the leading-out electrodes between successive firing positions.

Another object is to provide a distributor arrangement wherein the distributing member is moved past a plurality of consecutive leading-out electrodes between successive firing positions.

A further object is to provide an improved ignition current distributor wherein the arcs which trail the leading-out electrodes do not intervene successive distributing positions, a feature of my invention in this respect being to supply a succession of current impulses to the leading-out electrodes progressing in a direction along the electrodes different from that of the immediate source feeding the electrodes.

Still other and allied objects of my invention will more fully appear from the following description and the appended claims.

In the description of my invention reference is had to the accompanying drawings, of which:

Figure 1 is a sectional view of a distributor in accordance with one preferred embodiment of my invention wherein the distributing member and selector ring are driven in opposite directions, the section being taken along the line 1—1 of Figure 2;

Figure 1a is a view showing a detail in the structure of Figure 1, taken along the line 1a—1a of Figure 2;

Figure 2 is a sectional view taken substantially on the line 2—2 of Figure 1 and showing the distributing member and selector ring in the positions which they occupy for feeding out a regular current impulse;

Figure 3 is a fractional view, similar to Figure 2, but illustrating the distributing member and selector ring in registration to feed out a booster current impulse;

Figure 4 is a fractional view similar to Figure 2 but showing the type of selector ring of that figure modified for a reduced relative speed between the distributing member and selector ring, the parts being shown in the positions which they occupy when a regular current impulse is to be fed out;

Figure 5 is a view similar to Figure 4 but showing the parts in the positions which they occupy for feeding out a booster current impulse;

Figure 6 is a fractional view illustrating the use of a second type of selector ring, the distributing member and selector ring being here again driven in opposite directions;

Figure 7 is a view illustrating a structural arrangement functionally equivalent to that of Figure 6 wherein there is employed a selector ring of the type first abovementioned;

Figure 8 is a view illustrating a distributor employing my first type of selector ring wherein the distributing member and selector ring are driven in the same direction;

Figure 9 is a fractional sectional view of the drive mechanism for the distributor illustrated in Figure 8;

Figure 10 is a view illustrating a distributor employing the abovementioned second type of selector ring wherein the distributing member and selector ring are driven in the same direction;

Figure 11 is a fractional view illustrating a distributor according to my invention having an independent booster circuit; and Figure 12 is a fractional sectional view taken substantially on the line 12—12 of Figure 11.

In the illustrative embodiments of my invention herein shown, there is provided a usual form of molded distributor block 20 having a head 21 and depending annular flange 22 as is shown in Figures 1 and 2. This block carries a circularly arranged set of leading-out electrodes 23 of which there are nine in the present instance equidistantly spaced about the interior wall of the flange 22. These electrodes extend up into the head 21 wherein they are to make connection, in any usual way not herein necessary to show, with respective leading-out conductors 24, there being lateral openings 25 in the head 21 to receive such conductors. At the center of the head 21 there is a supply terminal in the form of a spring-pressed plunger 26. This plunger is housed in a cylindrical member 27 which is threaded into a bushing 28 that is embedded in the distributor head. This supply terminal is connected to a leading-in conductor 29 which is received in a lateral opening 30 of the distributor head and pieced by a pointed extension 27' on the end of the member 27. It will be understood that the conductors 24 are to connect to the spark plugs of an engine and that the conductor 29 is to connect to a source of current impulses such as a magneto, such engine and magneto being however not herein necessary to show.

In the embodiment shown in Figures 1 and 2, there is a central distributing rotor 31 and a concentrically journalled selector device 32, these parts being hereinafter respectively termed merely as "rotor" and "selector." The rotor comprises a molded body of insulating material, for example of a disk shape, into which there is embedded a main radial conductor element 33 having its inner end portion 34 exposed at the top and center of the rotor body for making contact with the supply terminal 26, and having its outer end portion extending beyond the periphery of the rotor body to form a distributing electrode 35. The selector comprises a dish-shaped body of insulating material having an upright flange 32' between the rotor and the leading-out electrodes into which are molded two diametrically located and radially extending conductor elements 36a and 36b. These conductor elements extend beyond the inner and outer walls of the flange to form respective ingoing and outgoing electrodes. These ingoing and outgoing electrodes are to register respectively with the distributing electrode 35 and with the leading-out electrodes 23 as is hereinafter explained.

The rotor 31 is removably mounted on a shaft 40 which constitutes the drive shaft for the distributor, the mounting means comprising an axial post 41 which is anchored into the body of the rotor and fitted into a hollow end portion 42 of the drive shaft, and a key between the rotor and shaft generally referred to as 42. The shaft 40 extends through a cylindrical housing 43 which is secured by bolts 44 to the end of the flange 22 of the distributor block. The housing has a central cylindrical extension 45 carrying an upper bearing 46 for the drive shaft, and has a central well 47 at the bottom into which is fitted a bearing 48 for the shaft, these bearings 46 and 48 being suitably of the oil impregnated and antifriction types.

The selector 32 is removably connected to a cylindrical hub 50 of a flanged member 51 hereinafter explained. This removable connection is made through a ring 52 which is anchored into the body of the selector and seated onto an inwardly-flanged end portion of the hub, the ring being locked to the hub by a screw 53 as is shown. The hub 50 is journalled onto a bearing 54 carried exteriorly by the extension 45 of the housing 43, this bearing being also suitably of the oil impregnated type. As so mounted, it will be seen that the selector is journalled concentrically with the distributing rotor for separate rotation in relation thereto.

In the embodiment of Figures 1 and 2, the distributing rotor 31 and selector 32 are driven in opposite directions and at a relative speed ratio of 8:1, the rotor being for example driven in a clockwise direction at twice the speed of the engine it is to serve and the selector being driven in a counter-clockwise direction at one-fourth such engine speed. A differential drive transmission, which is provided between the hub 50 and drive shaft 40 to so drive these parts, comprises a drive pinion 55 secured to the drive shaft within the well 47, a larger diameter gear 56 journalled onto a stud 57 carried by the housing 43 and in mesh with the pinion 55 (there being a window 58 in the wall of the housing extension 45 through which the gear 56 extends), a smaller diameter gear 59 secured to and concentric with the gear 56, and an internal gear 60 carried by the flanged member 51 and in mesh with the gear 59. A partition wall 61 is clamped between the housing 43 and distributor block by the bolts 44 aforementioned, and may be also separately clamped to the housing 43 by bolts 62, to form a compartment 63 for the gears separate from the distributor proper. The flanged member 51 is interposed between this partition wall and a shoulder 64 on the housing extension to be held against axial play. Oil or grease such as is provided in the gear compartment is prevented from leaking into the distributor proper by an oil seal 65 between the partition wall and hub 50 and by suitable packing between the hub and the drive shaft which is held in place by a flanged nut 67 that threads onto a reduced-diameter end portion of the hub.

The pinion 55 and smaller driven gear 59 have the same diameter, but the larger gear 56 has twice that diameter. Thus it will be seen that there is provided an 8:1 step-down in transmission ratio between the distributing rotor 31 and the selector 32. As the rotor is carried directly by the drive shaft, this shaft is to be driven at twice engine speed through suitable exterior gearing not herein necessary to show; when so driven in a clockwise direction, the selector will receive a counterclockwise movement at one-fourth engine speed.

In the relative positions occupied by the rotor 31 and selector 32 in Figure 2, the distributing conductor element 33 is in substantial radial alignment or registration with the conductor element 36a of the selector and the element 36a is in turn in registration with one of the leading-out electrodes 23 of the distributor, the position of which is designated as 1; thus, when the distributor parts occupy these relative positions any high tension current impulse received by the supply terminal 26 will be fed out to that leading-out electrode. By driving the rotor 31 at eight times the speed of the selector and in a direction opposite thereto the rotor will turn through a distance equal to four angular intervals of spacing between consecutive electrodes 23 while the selector moves through one-half the distance of one such interval. The distributing and selector conductor elements will thus next come into registration at the positions indicated by dash-dot lines in Figure 2—that is, the distributing element 33 will next register with the second selector element 36b in line with a leading-out electrode 23 at a spacing of four intervals in a clockwise direction from the electrode last fired, the position of this second electrode to be fired being designated as 2. This operation will repeat itself continuously and as a result the electrodes 23 will be fired successively in the order of the numbers of their positions appearing in Figure 2.

During the travel of the distributing conductor element past successive leading-out electrodes between firings, there is interposed between it and the electrodes the part of the insulating flange 32' of the selector which intervenes the selector elements 36. This flange 32' is made sufficiently high to prevent arcing over the top thereof, the flange being for instance extended up into a conforming recess 70 in the distributor head. Accordingly, the flange acts as an effective dielectric barrier for shielding the distributing conductor element and preventing misfiring of any electrodes between successive distributing positions.

In order to increase the effective dielectric spacing from the distributing and selector (ingoing) electrodes to the mounting means for the rotor 31 and selector 32, the rotor is provided with a depending annular flange 71 and the selector with a conforming annular groove 72 as appears in Figure 1. Also, in order that the leading-out electrodes may have a greater dielectric spacing from the partition wall 61, this wall is covered on the distributor side with an annular disk 73 of insulating material.

It will be seen that at each instant of firing there are two air conductance paths from the distributing position then active to the one last preceding it. Take, for example, the instant a current impulse is fed to the electrode whose position is designated as 2, the positions of the distributing and selector conductor elements then being as is shown by dash-dot lines. One air conductance path here designated as H leads from the distributing element 33 to the leading-out electrode at position 1 through the selector element 36a and another air conductance path here designated as G leads from the distributing element through the selector element 36b and along the periphery of the flange 22 to the leading-out electrode at position 1. The first path H extends along the trailing arcs both between the distributing and selector elements and between the selector element and leading-out electrode and thus tends to be ionized. An important feature of my invention, however, is that this path is made exceptionally long, it being in the present instance five (angular) intervals in length as against the usual one interval of length obtained in conventional distributor arrangements.

The second air conductance path G is on the side of the leading-out electrode at position 1 opposite to that of the arc which trails this electrode. For instance, the arc will trail from the electrode in a counterclockwise direction—the direction of movement of the selector element 36a—whereas the firing or distributing positions progress in a clockwise direction—which is the direction of movement of the distributing rotor. Thus, the air path G does not tend to be ionized and is in no way a possible source of breakdown.

A further important feature of the instant embodiment is that the selector elements 36 are never brought into registration with a leading-out electrode except for the purpose of firing that electrode. For instance, when the distributing motor and selector device move out of registration at firing position 1 and into registration at firing position 2, the selector element 36 fired at position 1 moves only half way between consecutive electrodes. The arc which tends to trail from the electrode at position 1 is thus not extended to the adjacent electrode, and accordingly there is no danger of misfiring that electrode.

Since the region between the rotor 31 and the flange 32' of the selector will tend to be ionized constantly by the arcs which will trail from the distributing electrode, the dielectric insulation of the gases in this region will tend to be reduced. It is, however, a feature of my invention to ventilate this region so as to drive out constantly the ionized gases being formed therein. The means by which this ventilating is done comprises a series of inlet and outlet ducts 74 and 75 in the flange 22 and head 21 respectively of the distributor block of which the outlet ducts 75 lead from the region between the rotor 31 and selector 32 as is shown, and a series of ducts 76 extending through the lower part of the selector flange. As is shown in Figure 1a, these ducts 76 lead outwardly through the flange with an inclination toward the direction of advance of the selector so as in effect to provide the selector with vanes for propelling the air inwardly between the distributing rotor and selector and out through the ducts 75. For increasing the amount of air circulation, the selector may have cup-like fins 77 extending outwardly therefrom as is shown.

A booster circuit is incorporated into the embodiment of Figures 1 and 2, and comprises simply a collector ring 78 that is molded into the head of the distributor block and adapted in the usual way for connection to a supply conductor, and a radial conductor element 79 molded into the rotor body and connected at its inner end to a pin 80 which is located to register with the collector ring, the collector ring being suitably set into an annular recess 81 in the head 21 so as to have a greater spacing from the supply terminal 26 and the rotor 31 being accordingly provided with a conforming annular flange 82. This booster circuit is adapted to provide a 40° time lag in respect of engine rotation. Since the selector is turned at only one-fourth engine speed in this embodiment, its conductor elements 36 will be displaced only 10° from a regular firing position when the engine has turned through 40°. Since a displacement of 10° of a selector element from a leading-out electrode does not create an excessive gap therebetween the regular selector elements can be relied upon to complete the booster circuit. This gap may however be made even shorter, without substantially increasing the gap between the selector and electrode when the selector is in regular firing position, by offsetting the selector elements relative to the selector flange 32' in the direction opposite to that of the selector movement, as may be observed by reference to Figure 2. Since the rotor is turned at twice engine speed, it will be displaced 80° as the engine turns through 40°; accordingly, in order for it to come into registration with the selector element when the booster current impulse to be distributed is received, it is to be set back 90° (10°+80°) from the main distributor conductor element 33. When the booster elements 79 and selector element 36a register, the rotor and selector will then occupy the relative positions shown in Figure 3.

It is seen that a relatively slow selector speed permits the incorporation of a very simple booster circuit, and that this is true regardless of the number of cylinders to be served. Moreover, no loss in the effective dielectric insulation between succesive distributing positions is incurred by the provision of the booster circuit. Rather, instead, because the booster electrode follows in the arc trailing the main distributing electrode 35, the booster electrode has a spark quenching action on this arc tending to improve the dielectric insulation in the distributor.

In Figure 4 there is a diagrammatic showing of a distributor for a nine-cylinder engine wherein the rotor is driven in a clockwise direction at engine speed and the selector in a reverse direction at one-half engine speed. The selector 132 is here of the same type as that above described but differs in the number of selector elements 36 with which it is provided, there being in this instance three such elements equidistantly spaced and designated respectively as 36a, 36b and 36c. In the positions occupied by the rotor and selector in Figure 4, there will be fired the leading-out electrode 23 at position 1. For the speeds and directions of the rotor and selector just mentioned, the rotor conductor element will next come into registration with the selector element 36b at a position in line with the leading-out electrode at two intervals of spacing in a clockwise direction from the electrode last fired, which is at the position designated as 2. As this procedure repeats, the distributing conductor element next comes into registration with the selector element 36c at a position in line with the electrode at two intervals beyond that at position 2, the position of which electrode is designated as 3. Alternate leading-out electrodes are thus fired in succession according to the numbers of their positions as appears in Figure 4.

It is seen that the rotor and selector conductor elements occupy the positions shown in dash-dot lines when they register to fire the leading-out electrode at position 2. The air path H trailing the distributing electrode 35 to the nearest previous leading-out electrode—which is the electrode adjacent the one last fired at position 5—is here three (angular) intervals long. The other path G is as before not ionized and is no source of possible breakdown. Thus, it is seen that an unusually large effective insulation is here provided between successive distributing positions even when the rotor and selector are driven at moderate speeds and ratio. While the structure for this embodiment is not herein shown, it will be understood that the same arrangement of parts may be here employed as are used in the first embodiment above described, except that the drive ratio of the gearing between the rotor and selector is to be altered.

The distributor illustrated in Figure 4 has a booster circuit incorporated therein which is adapted to provide a 40° delay in terms of engine speed. This booster circuit includes the booster conductor element 79 and associated pin 80 above described. Because the rotor and selector are driven in opposite directions respectively at engine speed and at one-half engine speed, the booster element 79 is set back from the main distributor element 33 at 60° (1½×40°). However, because of the appreciable displacement (20°) of the selector from regular firing position when the booster current impulse to be distributed is received, the selector elements are provided with shoes 83. These shoes serve to reduce the gap length between each selector element and the associated leading-out electrode 23 to be fired, which is obtained at the time that selector element is in registration with the booster element 79. For example, when the booster element 79 and selector element 36a register to fire the electrode 23 at position 1, the distributor parts occupy the relative positions shown in Figure 5.

The two embodiments above described illustrate two different suitable distances of spacing between successive distributing positions. As a generality, the successive distributing positions may be spaced, in terms of the number of intervals between consecutive leading-out electrodes, by any predetermined number of such intervals which is not a factor of any one of the integral multiples, up to that predetermined number, of the number of leading-out electrodes provided. This applies for both even and odd numbers of leading-out electrodes. For example, for nine electrodes, the distance between successive distributing positions may be 1, 2, 4, 5, 7 or 8 intervals.

Figure 6 shows diagrammatically another embodiment of my invention wherein the rotor and selector are again driven in opposite directions but wherein the selector is of a different type. In this embodiment a selector 232 is provided with three equidistantly spaced ingoing electrodes 84a, 84b and 84c and with one outgoing electrode 85 all of which are interconnected by a ring 86 embedded in the selector flange 232'. The rotor is here to be driven at engine speed and the selector at one-half engine speed, the same as in the embodiment of Figures 4 and 5. Thus, the distributing conductor element will register with successive ones of the ingoing electrodes 84 at every other one of the leading-out electrodes, and the outgoing electrode 85 will register simultaneously in a counterclockwise direction with consecutive ones of the leading-out electrodes 23. The electrodes 23 are thus fired consecutively according to the numbers of their positions appearing in Figure 6.

Figure 7 illustrates an alternative arrangement which is functionally equivalent to that shown in Figure 6. In this embodiment the rotor and selector are again driven in opposite directions respectively at engine speed and at one-half engine speed. The rotor 331 is here however provided with three equiangularly spaced and interconnected radial conductor elements 87a, 87b and 87c. The selector 332 is of the type hereinabove first described, but has only one selector element 36. Accordingly, it will be seen that as in the embodiment of Figure 6, the distributor elements will register consecutively with the selector element 36 at positions of the latter in line with consecutive ones of the leading-out electrodes progressing in a counterclockwise direction, the direction of movement of the selector. Thus the electrodes 23 are fired consecutively according to the numbers of their positions appearing in Figure 7, the same as in the embodiment of Figure 6.

In these embodiments of Figures 6 and 7 the distributing electrode is moved away from its last associated selector element 36, between successive firings, by an amount equal to three angular intervals of spacing between consecutive ones of the electrodes 23. Although the outgoing electrode of the selector is moved, between successive firings, only one interval from each electrode 23 last fired, the tendency of arcs to trail the distance between consecutive electrodes is not great as these arcs are soon quenched by the lengthening displacement of the distributing electrode 35, which is the source of the arc.

In Figures 8 and 9 there is shown an embodiment of my invention wherein the rotor and selector are the same as in the embodiment of Figure 4 but wherein they are driven in the same direction respectively at twice and at one-half engine speed. The drive mechanism for this embodiment has many parts which are substantially the same in construction as are the analogous parts in the embodiment of Figure 1, and which accordingly given the same reference characters. For example, there is here employed the housing 43 having a central extension 45 supporting the bearings 46 and 54 and having the central well 47 at the bottom in which there is fitted the bearing 48; also this housing is secured to the distributor block by bolts 44, and is separated therefrom by a partition wall designated as 90. In this embodiment the rotor 231 is carried by a central shaft 91 which is journalled in the bearings 46 and 48 but which is not projected beyond the housing as it is not here the drive shaft; this shaft 91 however carries the pinion 55 within the well 47 as in the prior embodiment. Journalled in a bearing 92, which is mounted in the housing 43 (in place of the stud 57), and in a bearing 93 that is carried by the partition wall 90 is a drive shaft 94, which is to be driven at engine speed through suitable gearing not shown. This drive shaft has a gear 95 secured thereto which meshes with the pinion 55 and also a pinion 96 which meshes with a gear 97 that is journalled on the bearing 54, this gearing 97 having the hub 50 carrying the selector 431 in the same way as in the embodiment in Figure 1. The pinions 57 and 96 each have one-half the diameter of their respectively associated gears; accordingly, the rotor and selector will be driven respectively at twice and at one-half the speed of the drive shaft 94, at a speed ratio of 4.

In the relative positions occupied by the rotor and selector in Figure 8, the rotor and selector conductor elements are in registration with the electrode 23 at position 1. Since the rotor is here driven four times as fast as is the selector, it will traverse four intervals between consecutive electrodes 23 as the selector traverses one such interval; as a result, the distributing electrode 35 will next catch up with the selector element 36b when this element registers with the electrode 23 at position 2, which is at four intervals in a clockwise direction from the electrode last previously fired. This procedure repeats constantly and as a result every fourth electrode 23 is fired as is indicated by the numbers of their positions appearing in Figure 8.

It will be seen that the dielectric spacing between successive distributing positions in this embodiment is similar to that obtained in the embodiments in Figures 6 and 7. For example, when the rotor and selector conductor elements are in registration to fire the electrode 23 at position 2, the positions of these elements then being as is indicated by dash-dot lines, the shortest air conductance path H to the selector element 36a last fired and from this element to any preceding electrode 23 is three (angular) intervals long, this preceding electrode being here not the one last fired at position 1 but the one next to it at position 8. The path G from the selector element 36b to previous electrodes 23 is again no great source of breakdown as this path extends through regions which are not ionized.

In Figure 10 there is illustrated another embodiment of my invention employing the selector of Figure 6 above described but wherein the rotor and selector are driven in the same direction respectively at twice and at one-half engine speed. The rotor conductor element 33 will here register with the consecutive ingoing electrodes 84a, 84b and 84c of the selector at every fourth one of the electrodes 23, but these electrodes 23 will be fired consecutively as is indicated. The dielectric spacing of the rotor and selector conductor elements is thus the same as in the embodiment of Figure 6, as the distributing electrode 35 is spaced, between successive firings, three angular intervals from each previous ingoing selector electrode.

In Figures 11 and 12 there is shown a distributor embodiment according to Figure 4 but wherein there is incorporated an independent booster circuit. Here there is provided a rotor 100 having the main distributing element 33 therein, and a selector 101 having a flange 101' carrying the three equidistantly spaced selector elements 36a, 36b and 36c. The rotor and selector flange are here increased respectively in thickness and in height to accommodate an independent set of booster conductor elements at a level above that of the main distributor elements. These booster elements comprise the distributing element 79 aforedescribed and a set of three selector elements 36a', 36b' and 36c'. When the rotor and selector are driven in opposite directions respectively at engine speed and at one-half engine speed the distributing element 79 will register with the booster selector elements in succession to feed the electrodes 23 in the sequence of the numbers of their positions appearing in Figure 11, which is the same as in the embodiment of Figure 4. To obtain the usual 40° time delay in terms of engine rotation each booster element is set back in degrees by an amount equal to the product of the desired delay and of the ratio of the speed of the respective element relative to engine speed. Thus, the booster distributing element 79 is set back from the main distributing element 33 by forty degrees and the booster selector elements are set back from the respective main selector elements each by twenty degrees. To effectively isolate the booster circuit from the main distributing circuit, there may be provided an annular flange 102 on the rotor between the booster and main distributing electrodes.

While I have herein described and illustrated my invention in terms of certain preferred embodiments adapted for use with nine-cylinder engines, it will be understood that I intend no limitation of my invention to distributors for that number of cylinders as the principles herein disclosed may be adapted to distributors for any odd or even numbers of cylinders. Moreover, it will be understood that I intend no unnecessary limitation of my invention to the details of construction and arrangement of parts herein disclosed, since these may be varied within the range of engineering skill without departing from the spirit of my invention, which I endeavor to express according to the following claims.

I claim:

1. An electric current distributor comprising a series of leading-out electrodes; a distributing member moved relatively to said electrodes; and a unitary selector device moved in predetermined relation to said distributing member and including conductive means registering with successive predeterminately selected ones of said series of electrodes and simultaneously with said distributing member at successive progressive positions along the path of the latter.

2. An electrical distributor comprising a set of leading-out electrodes; a driven distributing member; and a driven selecting member having current conductor means moved along said set of leading-out electrodes and along the path described by said distributing member into recurring registration with said distributing member and with successive predeterminately selected ones of said leading-out electrodes.

3. An electrical distributor comprising a set of leading-out electrodes; a distributor member having a feeding-out electrode moved relatively to said set at a distance therefrom; and a selector member having conductor means interposed between said set and the path of movement of said feeding-out electrode for bridging the spacing between said path and said set, said selector member being driven to move said conductor means both along said set and along said path into successive selective registrations with said distributor member and said leading-out electrodes.

4. In an electrical distributor: the combination with a set of leading-out electrodes of a distributor member spaced from said set and moved relative thereto along a prescribed path; and a selector member having conductor means moved relative to said leading-out electrodes along said path in the direction opposite to that of said distributor member whereby to couple said distributor member to said leading-out conductors in predetermined selective order.

5. Means for distributing current impulses from a supply electrode to a set of leading-out electrodes, comprising a distributing member moved in a prescribed path and electrically connected to said supply electrode; a barrier moved between said path and said set of leading-out electrodes; and current-carrying means in said barrier moved into simultaneous registrations with said moving distributing member and with said leading-out electrodes selectively.

6. In a distributor: the combination of a series of leading-out electrodes; a distributing member moved relatively to said leading-out electrodes; selector means interposed between the path of movement of said distributing member and said leading-out electrodes and driven in predetermined timing relation to said distributing member, said selector means being adapted to electrically associate said distributing member with successive predeterminately selected ones of said leading-out electrodes and to shield the distributing member from said leading-out electrodes between electrode-associations; and means to ventilate the region between said distributing member and said selector means.

7. Means for distributing current impulses from a supply electrode to a plurality of leading-out electrodes, comprising a distributing means electrically connected to said supply electrode and moved in one direction relative to said leading-out electrodes, a barrier means between said distributing means and leading-out electrodes moved in another direction in fixed timed relationship with said distributing means, and current-carrying means extending through said barrier means to couple said distributing means to said leading-out electrodes in recurring succession and in predetermined selective order.

8. Means for distributing current impulses from a supply electrode to a plurality of leading-out electrodes, comprising a distributing means electrically connected to said supply electrode and moved at one speed relatively to said leading-out electrodes; barrier means between said distributing means and leading-out electrodes moved relatively to the latter at another speed; and current-carrying means in said barrier means, said distributing and barrier means being so timed that said current-carrying means registers recurrently with said distributing means and simultaneously with said leading-out electrodes in recurring predetermined selective order.

9. Means for distributing current impulses from a supply electrode to a plurality of leading-out electrodes successively arranged, comprising a distributing means electrically connected to said supply electrode and moved in one direction along said leading-out electrodes, a barrier means between said distributing means and leading-out electrodes moved in the opposite direction relative to the latter, and current-carrying means extending through said barrier means and positioned for registration with said distributing means and said leading-out electrodes selectively, said distributing and barrier means being moved at relative speeds to cause the current-carrying means to register recurrently with said distributing means and simultaneously with said leading-out electrodes in recurring predetermined selective order.

10. Means for distributing current impulses from a supply electrode to a plurality of leading-out electrodes circularly arranged, comprising a rotary distributing member electrically connected to said supply electrode and journalled at the center of said circular arrangement of leading-out electrodes; an annular barrier between the distributing member and said leading-out electrodes and journalled coaxially with the distributing member, conductor means in said barrier having inner and outer portions exposed for registration with said distributing means and leading-out electrodes respectively; and means to drive said distributing and barrier means in fixed predetermined relationship to electrically associate the distributing means with said leading-out electrodes in recurring selected sequence.

11. In combination, a current distributing rotor, a circularly arranged set of leading-out electrodes surrounding said rotor, and rotary means between said rotor and said leading-out electrodes for shielding the rotor from said electrodes through successive predeterminately spaced intervals and for selectively coupling the rotor to said electrodes between said intervals.

12. A distributor for high tension current impulses comprising a series of leading-out electrodes, a distributing member moved along said electrodes, and means moved between said distributing member and said electrodes for recurrently isolating the distributing member from the electrodes.

13. A distributor for high tension current impulses comprising a series of leading-out electrodes, a distributing member moved along said electrodes, and means moved between said distributing member and said electrodes for isolating the distributing member recurrently from successive predeterminately separated groups of said electrodes, each of said groups being of a predetermined number.

14. A distributor for high tension current impulses comprising a set of leading-out electrodes successively spaced at equal intervals, a distributing member moved relatively to said electrodes, and a selector device driven in fixed speed ratio to said distributing member between the distributing member and said electrodes, for electrically coupling the distributing member to said electrodes in a sequence wherein successive selected ones of said electrodes are separated by a predetermined number of said intervals not a factor of any integral multiple, up to said predetermined number, of the number of said leading-out electrodes.

15. A distributing member for high tension current impulses comprises a series of leading-out electrodes, a distributing member moved past a plurality of said electrodes at a spacing therefrom between current impulses, insulating means moved between said distributing member and said electrodes at a speed predetermined in relation to that of said distributing member, and conductor means carried by said insulating means for associating said distributing member with succeeding ones of said electrodes separated by a predetermined number.

16. A distributor for high tension current impulses comprising a series of leading-out electrodes, a distributing member spaced from and moved along a predetermined number of said electrodes between successive impulses, and movable means between said distributing member and said electrodes driven at a predetermined speed in relation to that of said distributing member and adapted to isolate the distributing member from the electrodes between impulses and to couple the distributing member to successive predeterminately selected ones of the electrodes at the times of the impulses.

17. A distributor for high tension current impulses comprising a series of leading-out electrodes circularly arranged; a central rotary distributing member; and a selecting device including an annular barrier between said distributing member and electrodes journalled coaxially with said distributing member, and a plurality of separate equally-spaced conductor elements carried by said barrier and each adapted for registration with said distributing member and with said leading-out electrodes respectively; and means to drive said selecting device in predetermined timing relationship with said distributing member to electrically associate the distributing member with successive ones of said electrodes separated from one another by a predetermined number.

18. A distributor for high tension current impulses comprising a series of leading-out electrodes circularly arranged, a central rotary distributing member, a rotary selecting device including conductor means terminating into a plurality of equally spaced ingoing electrodes adapted for registration with said distributing member and into an outgoing electrode adapted for registration with said leading-out electrodes respectively, and a drive transmission between said distributing member and said selecting device for causing the distributing member to register with consecutive ingoing electrodes of said device as the outgoing electrode of the device registers with consecutive ones of said leading-out electrodes.

19. A distributor for high tension current impulses comprising a series of leading-out electrodes circularly arranged, a central distributing rotor having a plurality of equally-spaced interconnected feeding-out electrodes, a rotary selecting device between said rotor and leading-out electrodes having a conductor element arranged for registration with said feeding-out electrodes respectively and with said leading-out electrodes respectively, and means to drive said distributor rotor and selecting device at a predetermined relative speed to cause consecutive ones of said feeding-out electrodes to register with said conductor element as the element registers with consecutive ones of said leading-out electrodes.

20. An electrical distributor adapted for distributing high tension current impulses to a series of leading-out electrodes, comprising a distributing member driven in one direction along said electrodes; and a selector device driven between said distributing member and said electrodes at a predetermined speed and in a reverse direction in relation to the distributing member, for feeding current impulses successively to said electrodes in a sequence progressing along the electrodes in a direction opposite to that of the movement of said selecting device.

21. In an electrical distributor for an engine: the combination of a series of leading-out electrodes circularly arranged; a central rotary distributing member including a main feeding-out electrode and a separate booster feeding-out electrode set back from said main electrode, with respect to the direction of travel of the distributing member, to provide a predetermined retardation in timing during engine starting; a rotary selecting device between said distributing member and said leading-out electrodes including an ingoing electrode adapted for registration with said main and booster electrodes and an outgoing electrode adapted for registration with said leading-out electrodes; means to drive said distributing member and selecting device in predetermined timing relationship to cause said main distributing electrode to register recurrently with said ingoing electrode and simultaneously said outgoing electrode to register with successive predeterminately selected ones of said leading-out electrodes; and trailing conductor means on said outgoing electrode for reducing the gap length between said outgoing electrode and the respective selected ones of said leading-out electrodes which is obtained when said booster electrode registers with said ingoing electrode.

GEORGE H. FRITZINGER.